US 6,668,219 B2

(12) United States Patent
Hwang et al.

(10) Patent No.: US 6,668,219 B2
(45) Date of Patent: Dec. 23, 2003

(54) ARTIFICIAL INTELLIGENCE DIAGNOSTIC DEVICE FOR AUTOMOBILE AND CONTROL DEVICE FOR THE SAME

(75) Inventors: Chang-sun Hwang, Koyang (KR); Do-hyoung Kim, Seoul (KR)

(73) Assignee: Yu-il Tech. Co., Ltd. (KR)

( * ) Notice: Subject to any disclaimer, the term of this patent is extended or adjusted under 35 U.S.C. 154(b) by 77 days.

(21) Appl. No.: 09/912,846

(22) Filed: Jul. 24, 2001

(65) Prior Publication Data

US 2002/0059156 A1 May 16, 2002

(51) Int. Cl.$^7$ ................................................. G06F 7/00
(52) U.S. Cl. ............................ 701/29; 701/36; 701/44; 706/45; 340/438; 340/439
(58) Field of Search ............................ 701/29, 36, 44, 701/62, 77; 714/26; 706/45, 60; 340/438, 439

(56) References Cited

U.S. PATENT DOCUMENTS

| | | | | | |
|---|---|---|---|---|---|
| 3,961,239 A | * | 6/1976 | Lach | ........................... | 324/384 |
| 4,947,392 A | * | 8/1990 | Wada | ........................... | 714/55 |
| 5,337,320 A | * | 8/1994 | Kung | ........................... | 714/26 |

* cited by examiner

Primary Examiner—Gertrude Arthur
(74) Attorney, Agent, or Firm—Burns, Doane, Swecker & Mathis, L.L.P.

(57) ABSTRACT

An artificial intelligence diagnostic device is provided for performing concentrated management on electric devices and control devices of an automobile using a separate diagnostic central processing unit to diagnose the malfunction of the automobile in real time and for reporting the diagnosis result to a driver through a visual display or a voice. The artificial intelligence diagnostic device includes an electronic time and alarm control system diagnostic unit for diagnosing the state of an electronic time and alarm control system which controls electric devices of the automobile; a junction box diagnostic unit for diagnosing the states of the various fuses and relays included in a junction box; a diagnostic central processing unit for receiving and analyzing diagnosis signals output from the electronic time and alarm control system diagnostic unit, the junction box diagnostic unit, and an engine control unit, and generating a signal corresponding to an abnormal state; and an output unit for receiving the signal output from the diagnostic central processing unit and reporting the abnormal state to the driver. Since the normal or abnormal state of the electric devices is reported to the driver, the driver can easily know which part of an automobile has a malfunction while driving the automobile. Consequently, the automobile can be easily repaired in considerably less time at a low cost, and rapid measures can be taken when the automobile malfunctions. Moreover, since the automobile is automatically examined daily for malfunctions, accidents due to poor maintenance can be prevented.

21 Claims, 4 Drawing Sheets

ARTIFICIAL INTELLIGENCE DIAGNOSTIC DEVICE FOR AUTOMOBILE AND CONTROL DEVICE FOR THE SAME

BACKGROUND OF THE INVENTION

1. Field of the Invention

The present invention relates to a diagnostic device for an automobile and a control device for the same, and more particularly, to an artificial intelligence diagnostic device for diagnosing a problem in an automobile and reporting the diagnosed result to a driver, and an artificial intelligence control device having a self-diagnosis function.

2. Description of the Related Art

Conventionally, a variety of automobiles have been developed to increase the convenience to drivers. In addition, many control devices for controlling the automobiles have been developed. However, malfunctions due to causes which are difficult to be discovered, occur due to many electric devices and control devices. Since it is difficult for drivers themselves to repair an automobile having such a malfunction, the malfunction often perplexes drivers. Even when automobiles are checked and repaired at a service station, the great amount of time and cost it takes to diagnose the malfunction is inconvenient and unreasonable.

Conventional diagnostic devices for automobiles are realized as a simple device which checks whether the wire of a fuse or relay is broken and reports the result. Alternatively, conventional diagnostic devices for automobiles use a separate scanner and allow communication of information between the scanner and an engine control unit (ECU) through a separate communication connector so that drivers can watch and analyze the visualized result of diagnosis to determine the existence or non-existence of a malfunction. However, such diagnostic devices can be used only when drivers are informed that an automobile has a malfunction somewhere, so the malfunction cannot be corrected as soon as it occurs. In addition, there are many restrictions in using such devices. For example, drivers should carry an expensive scanner, be able to manage the scanner, and be familiar with analyzing data provided by the scanner. Further, since only drivers who can understand the wiring of an automobile can use the scanner, and diagnosis is performed after a driver discovers that there is something wrong with an automobile, the conventional diagnostic devices are not very effective at increasing the reliability of an automobile.

Moreover, although existing special diagnostic devices for automobiles allow drivers to be informed about details of a problem of an automobile, since the size of the devices takes up half of a seat in an automobile, and the price thereof is several thousand dollars, it is a burden on individuals or small service stations to use the devices.

At present, automobiles are a necessity to many people. In addition, technology related to automobiles is being rapidly developed, and the number of drivers is increasing. Moreover, control devices for controlling electric devices provided for increasing the convenience to drivers have been developed. However, conventional control devices have uniform set values for operating electric devices, which is inconvenient to drivers. In addition, the control devices are frequently out of order so that they cannot control the electric devices, which perplexes drivers. Accordingly, a device which can be easily managed by a driver, has a self-diagnosis function, and reports the result of diagnosis to the driver through a visual display or voice is desired.

SUMMARY OF THE INVENTION

To solve the above-described problems, it is an object of the present invention to provide an artificial intelligence diagnostic device for specially managing an automobile using a separate diagnostic central processing unit by diagnosing a malfunction of the automobile in real time and for reporting the result of the diagnosis to a driver through a visual display or voice.

It is a second object of the present invention to provide an artificial intelligence diagnostic device for performing concentrated management on an automobile using a separate diagnostic central processing unit to diagnose the malfunction of an automobile in real time, for reporting the result of the diagnosis to a driver through a visual display or voice, for storing the result of the diagnosis in a personal portable terminal as diagnosis data, and for wirelessly transmitting the result of the diagnosis to a control center through a mobile communications terminal to report the current malfunction state and repair records of the automobile to a service station or an emergency vehicle.

It is a third object of the present invention to provide an artificial intelligence control device for an automobile, which can be easily managed by a driver, has a self-diagnosis function, and reports the result of diagnosis to the driver through a visual display or voice.

To achieve one or more objects of the invention, there is provided an artificial intelligence diagnostic device for diagnosing a malfunction of an automobile, including an electronic time and alarm control system diagnostic unit for diagnosing the state of an electronic time and alarm control system which controls electric devices of the automobile; a junction box diagnostic unit for diagnosing the states of the various fuses and relays included in a junction box; a diagnostic central processing unit for receiving and analyzing diagnosis signals output from the electronic time and alarm control system diagnostic unit, the function box diagnostic unit, and an engine control unit, and generating a signal corresponding to an abnormal state; and an output unit for receiving the signal output from the diagnostic central processing unit and reporting the abnormal state to the driver.

Preferably, the artificial intelligence diagnostic device further includes a first output unit including a lamp for indicating a specific fuse or relay having a malfunction in the junction box according to the result of diagnosis of the junction box diagnostic unit and a lamp driving circuit. Preferably, the output unit includes a second output unit for reporting the abnormal state to the driver through a character message. Preferably, the output unit includes a third output unit for reporting the abnormal state to the driver through a voice message. Preferably, the diagnostic central processing unit receives and analyzes the diagnosis signal from the junction box diagnostic unit, and drives the first output unit to light a lamp corresponding to a specific fuse or relay having a malfunction and outputs a character message and a voice message reporting the state of malfunction through the second and third output units, respectively, when it is determined that the fuse or relay in the junction box malfunctions. Preferably, the diagnostic central processing unit receives and analyzes the diagnosis signal from the engine control unit and outputs a character message and a voice message reporting the state of malfunction in the engine control unit through the second and third output units, respectively, when it is determined that the engine control unit malfunctions. Preferably, the diagnostic central processing unit receives and analyzes the diagnosis signal from the electronic time and alarm control system diagnostic unit and outputs a character message and a voice message reporting the state of malfunction in the electronic time and alarm control system through the second and third output units, respectively, when it is determined that the electronic time and alarm control system malfunctions.

To achieve one or more objects of the invention, there is provided an artificial intelligence diagnostic device for diagnosing a malfunction of an automobile, including a diagnostic circuit for diagnosing the state of an electronic time and alarm control system which controls devices provided to increase the convenience to a driver, the states of the various fuses and relays included in a junction box, the state of an engine control unit which checks and controls the state of an engine, and the state of an antilock break system; a central processing unit for receiving and analyzing a diagnosis signal output from the diagnostic circuit and outputting the result of diagnosis; an output unit for reporting the diagnosis result output from the central processing unit to the driver; and a communication output unit for outputting the diagnosis result in the form of a communication signal.

Preferably, each of a variety of electric devices of the automobile is provided with a circuit for measuring a current or a circuit for measuring a voltage depending on a method by which each electric device is driven, and the diagnostic circuit receives signals output from the circuits to diagnose the state of each electric device. Preferably, the output unit includes a character display unit, and a character message reporting the diagnosed result is output through the character display unit, a display unit of a navigation device installed in the automobile, or a display unit of a portable personal terminal. Preferably, the output unit includes a voice output unit, and a voice message reporting the diagnosis result is output through the voice output unit or a speaker of an audio system installed in the automobile via the external input terminal of the audio system. Preferably, the central processing unit outputs the diagnosis result to a mobile communications terminal connected to the communication output unit through the communication output unit so that the diagnosis result can be wirelessly transmitted to a control center through the mobile communications terminal.

To achieve one or more objects of the invention, there is provided an artificial intelligence diagnostic device for diagnosing a malfunction of an automobile, including a code analyzer for receiving and analyzing signals from an electronic time and alarm control system for controlling devices provided for the convenience of a driver, an engine control unit for checking and controlling the state of an engine, a transmission control unit, and a general electric device; a diagnosis unit for diagnosing the states of fuses and relays included in a junction box and outputting the diagnosed result, and for receiving a signal output from the code analyzer and outputting the result of diagnosing the state of the engine control unit, the transmission control unit, the electronic time and alarm control system and the general electric device; a lamp output unit for indicating a specific fuse or relay having a malfunction according to the diagnosis result output from the diagnosis unit; a data communication converter for receiving the diagnosis result from the diagnosis unit and converting it into a communication signal; and a diagnosis result output unit for receiving the signal output from the data communication converter and outputting the result of diagnosing the state of each electric device so that a driver can easily recognize the diagnosis result.

Preferably, the artificial intelligence diagnostic device further includes a wireless transmitter for converting the signal output from the data communication converter into a wireless signal which is transmitted, and a wireless receiver for receiving the wireless signal from the wireless transmitter and providing the wireless signal to the diagnosis result output unit. Preferably, the diagnosis result output unit is provided with particular operating software, and includes a personal digital assistant or a personal computer for receiving the signal output from the data communication converter, displaying the result of diagnosing the state of each electric device in a form which can be easily recognized by the driver or reporting the diagnosis result through a voice message, and outputting the diagnosis result to a mobile communications terminal so that the diagnosed result can be wirelessly transmitted to a control center through the mobile communications terminal.

To achieve one or more objects of the invention, there is provided an artificial intelligence control device for controlling electric devices of an automobile, including a controller for receiving signals from a variety of sensors and switches of an automobile, controlling an electric device in accordance with the signals received from each corresponding sensor or switch, and outputting a warning signal related to a particular electric device; a diagnosis unit for diagnosing a malfunction of each electric device; and an output unit for outputting the control state of the controller and the result the diagnosis by the diagnosis unit to allow a driver to recognize the result of diagnosis.

Preferably, the artificial intelligence control device further includes a communication unit connected to the controller to mutually communicate with a controller for other electric devices, thereby allowing the controller to share the results of controlling and diagnosing the electric devices with the controller for other electric devices. Preferably, the output unit includes a character display unit for outputting a character message, a voice output unit for outputting a voice message, and a transmitter for transmitting data to a portable terminal or a navigation device. Preferably, the artificial intelligence control device further includes an input unit for allowing the driver to set an ON/OFF function and timer function for each electric device and to set the input unit to change and store a control value. Preferably, the changing and storing of the control value set by the driver is performed by the central processing unit and a memory. Preferably, the timer function for the electric devices is performed by the central processing unit and an exclusive timer circuit.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, embodiments of the present invention will be described in detail with reference to the attached drawings.

Figure 1:
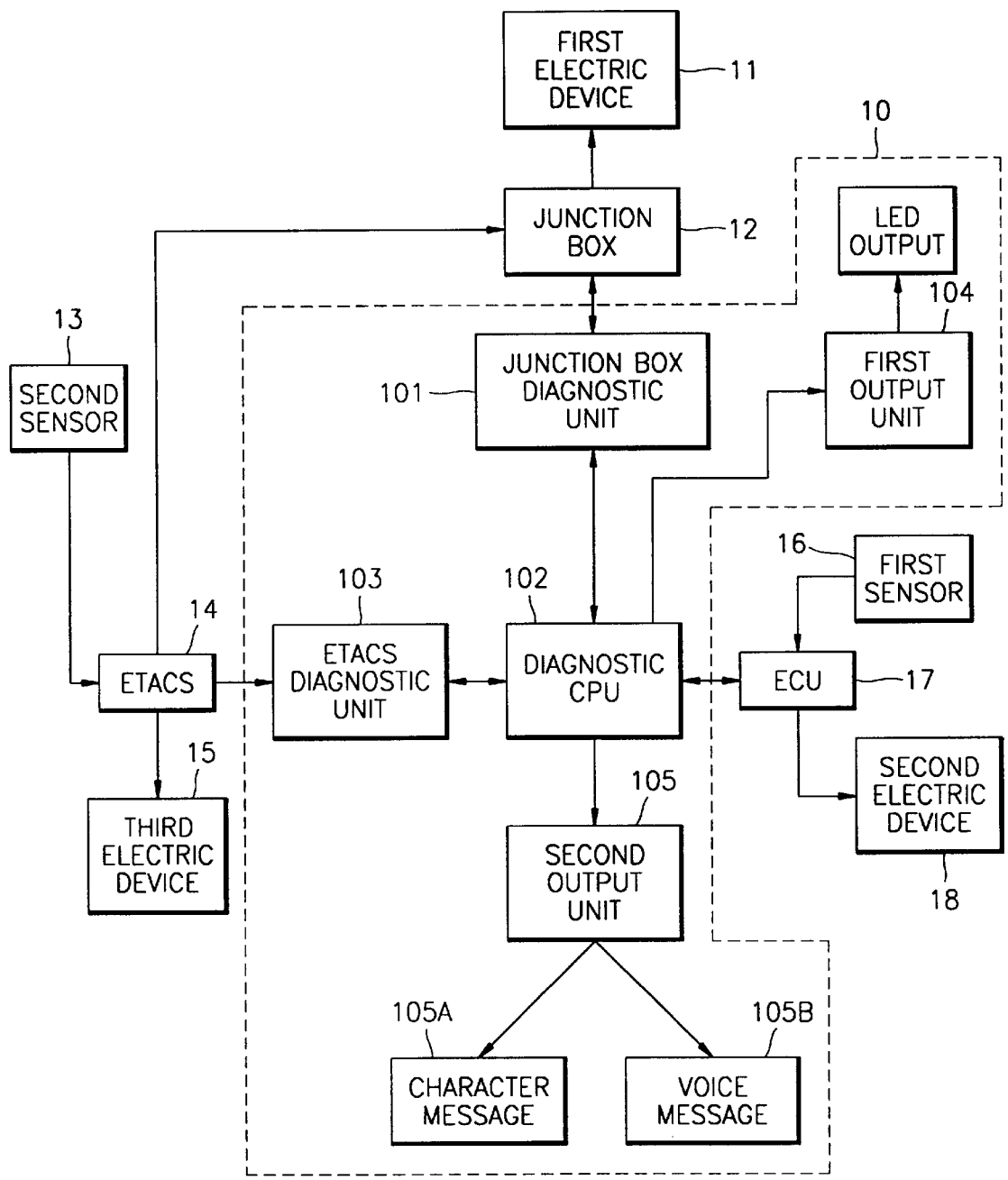
FIG. 1 is a block diagram of an artificial intelligence diagnostic device for an automobile according to a first embodiment of the present invention.

Referring to FIG. 1, an artificial intelligence diagnostic device 10 for an automobile according to a first embodiment of the present invention includes an Electronic Time and Alarm Control System (ETACS) diagnostic unit 103 for diagnosing the malfunction of an ETACS 14 which controls a variety of devices provided for the convenience to drivers; a junction box diagnostic unit 101 for diagnosing the malfunction of a variety of fuses and relays included in a junction box 12; a diagnostic central processing unit (CPU) 102 for receiving and analyzing diagnosis signals from the ETACS diagnostic unit 103, the junction box diagnostic unit 101, and an engine control unit (ECU) 17 for checking and controlling the state of an engine and for generating a signal corresponding to the occurrence of a malfunction in an electric device; and first and second output units 104 and 105 for reporting the signal output from the diagnostic CPU 102 to a driver.

The operation of an artificial intelligence diagnostic device having the above configuration according to a first embodiment of the present invention will be described with reference to FIG. 1. In FIG. 1, the ETACS 14 receives a sensed signal from a second sensor 13 and controls a third electric device 15 provided for the convenience to a driver. The junction box 12 is connected to a first electric device 11 and includes a variety of fuses and relays for protecting the electric parts and wiring of the automobile. The ECU 17 receives a sensed signal from a first sensor 16 and controls a second electric device 18 related to an engine, thereby checking and controlling the state of the engine.

The diagnostic CPU 102 receives and analyzes a diagnosis signal from the junction box diagnostic unit 101 for diagnosing broken fuses and relays in the junction box 12, a diagnosis signal from the ETACS diagnostic unit 103 for diagnosing a malfunction of the ETACS, and a diagnosis signal from the ECU 17 for checking and controlling the engine state. When it is determined as the analyzed result that there is something wrong with a fuse or relay in the junction box 12, the diagnostic CPU 102 drives the first output unit 104 to turn on a light emitting diode (LED) corresponding to the fuse or relay which has malfunctioned and outputs a character message 105A and a voice message 105B reporting the malfunction state through the second output unit 105. When it is determined that there is something wrong with the ECU 17, the diagnostic CPU 102 outputs a character message 105A and a voice message 105B reporting the malfunction state of the ECU 17 through the second output unit 105. When it is determined that there is something wrong with the ETACS 14, the diagnostic CPU 102 outputs a character message 105A and a voice message 105B reporting the malfunction state of the ETACS 14 through the second output unit 105.

Accordingly, the artificial intelligence diagnostic device 10 for an automobile according to the first embodiment of the present invention analyzes the diagnosis signals from the junction box diagnostic unit 101, the ECU 17 and the ETACS diagnostic unit 103 and visually and aurally reports to a driver which part of the first through third electric devices 11, 18 and 15 malfunctions, using the diagnostic CPU 102, so that the driver can easily understand which parts of an automobile have malfunctioned and the state of the malfunction.

As described above, the artificial intelligence diagnostic device 10 for an automobile according to the first embodiment of the present invention specially manages the ETACS 14, the ECU 17, the junction box 12 and other control units (not shown) which are essential for the operation of the electric devices of an automobile and for the connection of the electric devices, using the separate diagnostic CPU 102, thereby checking the malfunction of the automobile in real time. In addition, the artificial intelligence diagnostic device 10 reports the checked result to a driver by lighting an LED, a character message and a voice message so that the driver can immediately take measures to correct the current malfunction of the automobile.

In addition, drivers do not need to learn how to use a scanner, check automobiles by themselves or pay for unreasonable repair without knowing it because the diagnostic CPU 102 processes the diagnosis signals and automatically outputs the diagnosed result. According to the first embodiment of the present invention, drivers can easily know the parts having malfunction by just checking a character or voice message or the state of an LED even if they do not know how to use the diagnostic device.

Moreover, the diagnostic CPU 102 manages the electric devices through the relevant diagnostic units so that drivers can be informed of a malfunction of each electric device connected to controllers such as the ECU 17 and ETACS 14, which the drivers cannot be informed of by a simple diagnostic device, without checking it personally.

Particularly, a controller such as the ETACS 14 is configured to receive various kinds of driving information from the third electric device 15 provided for the convenience to a driver and directly control the third electric device 15 with its output. Accordingly, the artificial intelligence diagnostic device 10 for an automobile according to the first embodiment of the present invention is provided with the separate ETACS diagnostic unit 103. The diagnostic CPU 102 receives and processes a diagnosis signal generated by the ETACS diagnostic unit 103.

Figure 2:
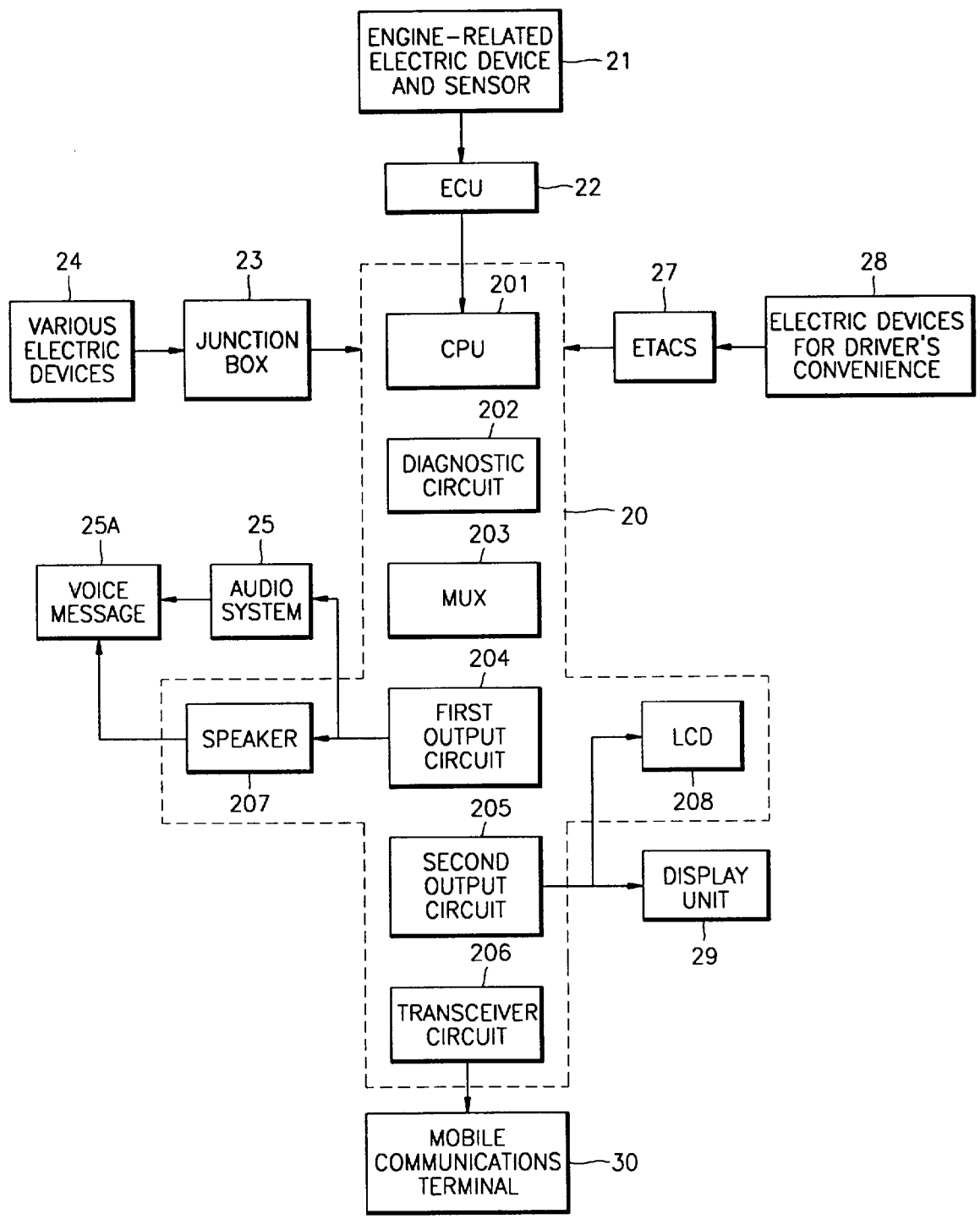
FIG. 2 is a block diagram of an artificial intelligence diagnostic device for an automobile according to a second embodiment of the present invention.

FIG. 2 is a block diagram of an artificial intelligence diagnostic device 20 for an automobile according to a second embodiment of the present invention. Referring to FIG. 2, the artificial intelligence diagnostic device 20 for an automobile includes a diagnostic circuit 202 for diagnosing the malfunction of an ETACS 27 for controlling a variety of devices provided for the convenience to a driver, the malfunction of a variety of fuses and relays included in a junction box 23, and the malfunction of an ECU for checking and controlling the state of an engine; a CPU 201 for receiving and analyzing a diagnosis signal output from the diagnostic circuit 202 and outputting the result of diagnosing the malfunction; a first output circuit 204 for outputting a voice output signal for reporting to a driver the result of diagnosis output from the CPU 201; a second output circuit 205 for outputting a character output signal for reporting to a driver the result of diagnosis output from the CPU 201; a transceiver circuit 206, i.e., a communication output unit, for outputting the result of diagnosis in the form of a communication signal; a speaker 207 for receiving the voice output signal from the first output circuit 204 and outputting a voice message; a liquid crystal display (LCD) 208 for receiving the character output signal from the second output circuit 205 and outputting a character message; and a multiplexer (MUX) 203 for multiplexing signals.

In FIG. 2, reference numeral 21 denotes an engine-related electric device and sensor connected to the ECU 22. Reference numeral 24 denotes a variety of electric devices connected to the junction box 23. Reference numeral 25 denotes an audio system of an automobile. Reference numeral 28 denotes electric devices connected to the ETACS 27 and provided for the convenience to a driver. Reference numeral 29 denotes the display unit of a navigation device installed in an automobile. Reference numeral 30 denotes a mobile communications terminal connected to the transceiver circuit 206.

The operation of the artificial intelligence diagnostic device 20 for an automobile having the above configuration according to the second embodiment of the present invention will be described with reference to FIG. 2. The diagnostic circuit 202 receives the result of measuring the malfunction of the junction box 23 and the results of measuring the malfunction of relevant electric devices through the ETACS 27, ECU 22, antilock break system (not shown) and transmission control unit (TCU) (not shown), and diagnoses the malfunction of the relevant electric devices. The CPU 201 receives and analyzes the result of diagnosis and outputs the analyzed result through the first output circuit 204 in the form of a voice output signal and through the second output circuit 205 in the form of a character output signal. The voice output signal is input to the speaker 207 or through an external input terminal to the audio system 25 installed in an automobile so that a voice message reporting the diagnosed result is output. The character output signal is input to the LCD 208 or the display unit 29 of the navigation device installed in the automobile so that a character message reporting the diagnosed result is output. Accordingly, a driver can understand which electric devices malfunction and the states of the malfunction through the voice message and character message when the electric devices malfunction.

In addition, the result of diagnosis is transmitted to the mobile communications terminal 30 connected to the transceiver circuit 206, then wirelessly transmitted to a control center (not shown) through the mobile communications terminal 30, and finally reported to a service station or an emergency vehicle connected to the control center.

Meanwhile, a circuit for measuring the flow of current or a circuit for measuring a voltage is installed at each electric device of the automobile to measure the malfunction or normality of the electric device and transmit the result value to the diagnostic device 20. The junction box 23 including a variety of fuses and relays measures the potential difference between both terminals of each fuse or relay and transmits the result value to the diagnostic device 20.

The ECU 22 for checking and controlling the state of an engine and the ETACS 27 for controlling the electric devices for drivers' convenience 28 transmit the result of diagnosing the malfunction of the engine and electric devices and the state of the malfunction in the form of a square wave having a variable duty cycle to the diagnostic device 20 through a self-diagnosis connector.

The diagnostic device 20 collects, arranges and analyzes the measured results and outputs the result of diagnosis in the form of a voice message 25A through the speaker 207 or the audio 25 and in the form of a character message through the LCD 208 or the display unit 29 of the navigation device installed in the automobile using an RS-232C serial link mode.

In addition, as described above, the result of diagnosis is transmitted to the mobile communications terminal 30 connected to the diagnostic device 20 in response to discovery of a malfunction of an electric device, to wirelessly transmit the result of diagnosing the malfunction of an automobile to a control center. The transmitted data is automatically reported to a service station or an emergency vehicle in response to the result of a computer automatically classifying the type of a malfunction. Therefore, it is possible to take a quick measure proper to malfunction.

Figure 3:
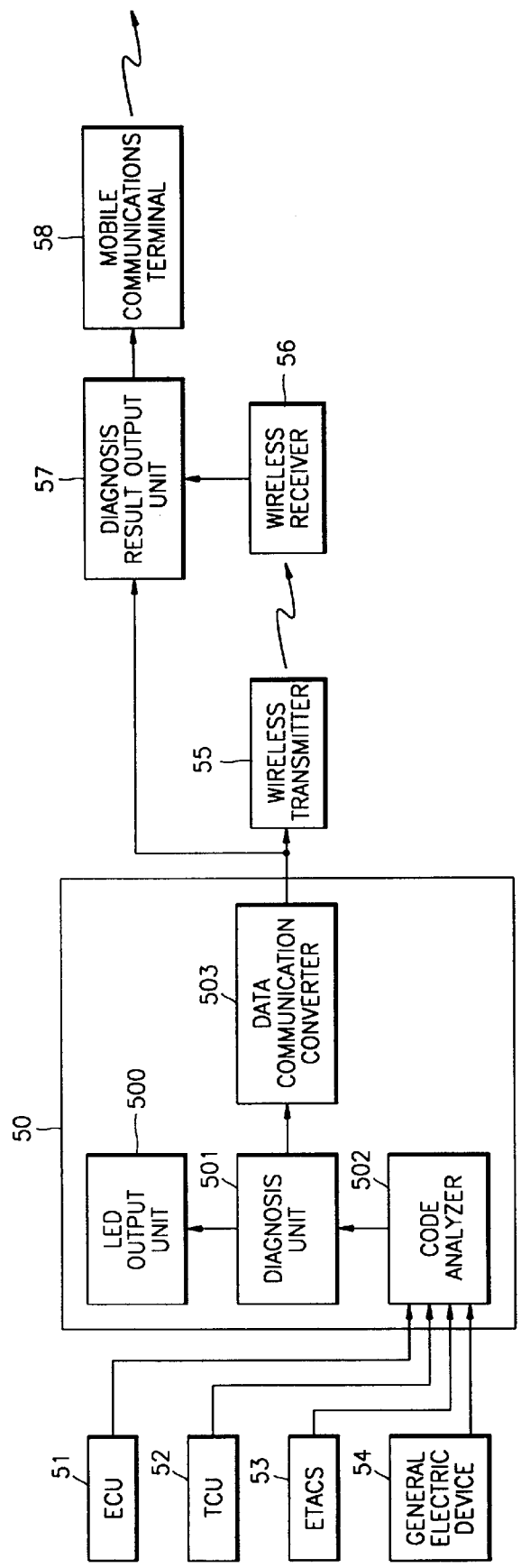
FIG. 3 is a block diagram of an artificial intelligence diagnostic device for an automobile according to a third embodiment of the present invention.

FIG. 3 is a block diagram of an artificial intelligence diagnostic device for an automobile according to a third embodiment of the present invention. Referring to FIG. 3, the artificial intelligence diagnostic device for an automobile according to the third embodiment includes a code analyzer 502 for receiving and analyzing signals from an ECU for checking and controlling the state of an engine, a TCU 52, an ETACS 53 for controlling devices provided for the convenience to a driver, and a general electric device 54; a diagnosis unit 501 for diagnosing the malfunction of fuses or relays included in a junction box 50 and outputting the result of diagnosis and for receiving a signal output from the code analyzer 502 and outputting the result of diagnosing the malfunction of the ECU 51, TCU 52, ETACS 53 and general electric device 54; an LED output unit 500 for indicating a specific fuse or relay having a malfunction according to the result output from the diagnosis unit 501, which is obtained by diagnosing the malfunction of the fuse or relay; a data communication converter 503 for receiving the result of diagnosis from the diagnosis unit 501 and converting it into a communication signal; and a diagnosis result output unit 57 such as a personal digital assistant (PDA) or a personal computer (PC) for receiving the signal output from the data communication converter 503 and outputting the result of diagnosing the malfunction of each electric device. Here, preferably, the junction box 50 includes the code analyzer 502, the diagnosis unit 501, the LED output unit 500 and data communication converter 503.

In addition, the diagnostic device shown in FIG. 3 includes a wireless transmitter 55 for converting the signal from the data communication converter 503 into a wireless signal and transmitting it, and a wireless receiver 56 for receiving the wireless signal from the wireless transmitter 55 and providing it to the diagnosis result output unit 57 such as a PDA or PC.

Although it is described that the signal output from the data communication converter 503 is transmitted wirelessly or via a wire to the diagnosis result output unit 57 in this embodiment, the signal can be transmitted to the diagnosis result output unit 57 by only one of a wired method and a wireless method.

Particular operating software is installed in the diagnosis result output unit 57 such as a PDA or PC so that the diagnosis result output unit 57 can receive the signal output from the data communication converter 503, display the result of diagnosing the malfunction of each electric device, storing the diagnosis result in a built-in memory, and output the diagnosis result together with previously stored repair records of an automobile to wirelessly transmit the diagnosis result to a control center (not shown) through the mobile communications terminal 58. Therefore, general management on the automobile can be achieved.

In an artificial intelligence diagnostic device having the above configuration according to the third embodiment of the present invention, the code analyzer 502 receives and analyzes the signals from the ECU 51, TCU 52, ETACS 53 and general electric device 54 and outputs the analyzed result to the diagnosis unit 501. The diagnosis unit 501 diagnoses the malfunction of fuses and relays included in the junction box 50 and outputs the result of diagnosis to the LED output unit 500. The diagnosis unit 501 also receives the signal from the code analyzer 502 and outputs to the data communication converter 503 the result of diagnosing the malfunction of the ECU 51, TCU 52, ETACS 53 and general electric device 54.

Once the result of diagnosing the malfunction of the fuses and relays and the result of diagnosing the malfunction of the ECU 51, TCU 52, ETACS 53 and general electric device 54 are output to the diagnosis result output unit 57 through the data communication converter 503, the diagnosis result output unit 57 displays a character message allowing a driver to easily recognize the diagnosis result or reports the diagnosis result through a voice message, using particular operating software. In addition, the diagnosis result output unit 57 outputs the diagnosis result to the mobile communications terminal in response to the occurrence of a malfunction, to wirelessly transmit the result of diagnosis to the control center.

Figure 4:
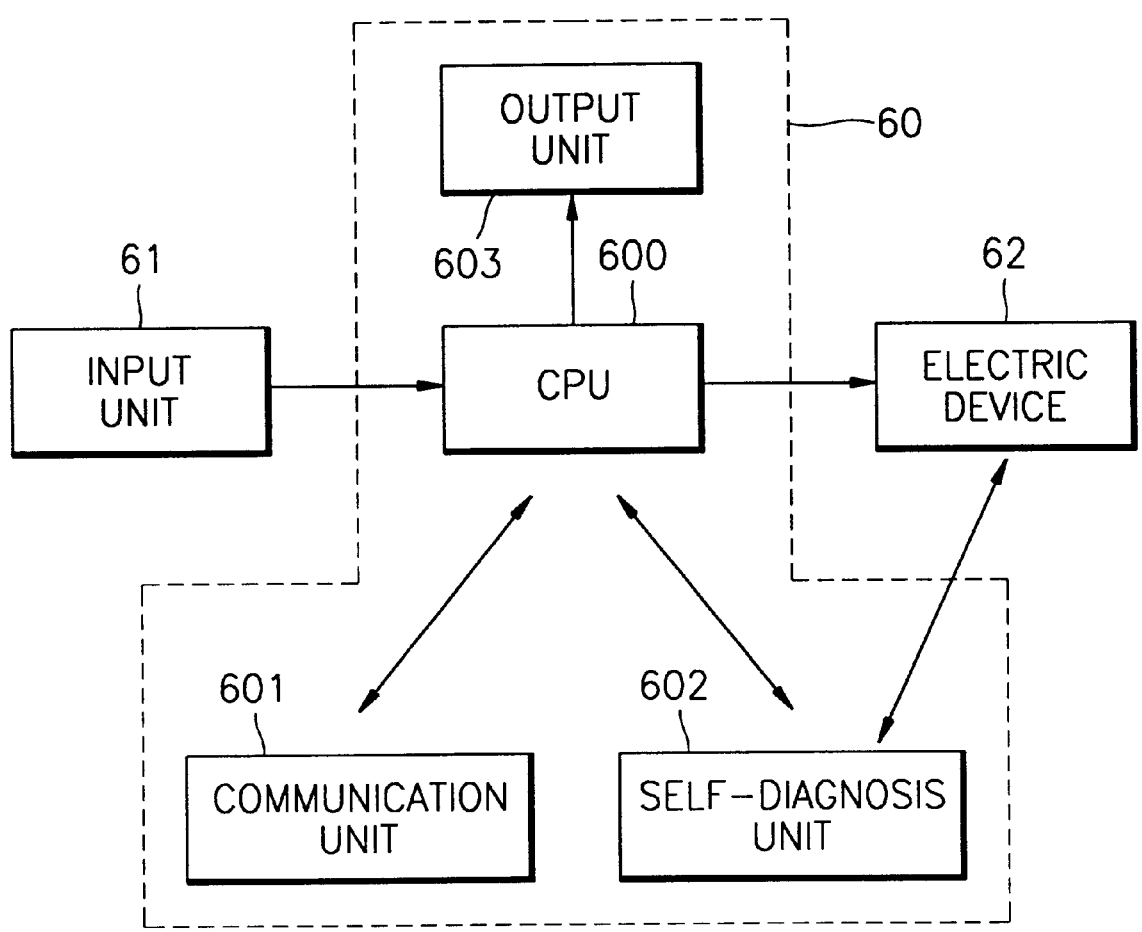
FIG. 4 is a block diagram of an artificial intelligence control device for an automobile according to a fourth embodiment of the present invention.

FIG. 4 is a block diagram of an artificial intelligence control device 60 for an automobile according to a fourth embodiment of the present invention. Referring to FIG. 4, the artificial intelligence control device 60 for an automobile according to the fourth embodiment includes a CPU 600 for receiving signals from a variety of sensors and switches of an automobile, controlling an electric device 62 in accordance with the signals received from each sensor or switch, and outputting a warning signal related to the particular electric device 62; a self-diagnosis unit 602 for diagnosing a malfunction of the electric device 62; an output unit 603 for outputting the control state of the CPU 600 and the result the diagnosis by the self-diagnosis unit 602 to allow a driver to recognize the result of diagnosis; and a communication unit 601 connected to the CPU 600 to mutually communicate with a controller for other electric devices (not shown), thereby allowing the CPU 600 to share the results of controlling and diagnosing the electric device 62 with the controller for other electric devices.

In FIG. 4, the CPU 600 controls the electric device 62 provided for the convenience to a driver and warns the driver of malfunction in the operation of wipers, automatic wiping and windscreen wiping fluid ejecting functions due to a rainfall sensor, a speed-sensitive door lock, a centralized door lock, a safety window which stops in response to sensed pressure, a function of adjusting the movement speed of a window, a function of adjusting the operating time of a room lamp, an automatic lighting function, a function of warning a driver that a safety belt is not fastened, a function of illuminating a key hole, the operation of a tail light, a function of warning that a key has been pulled out, and the like.

Referring to FIG. 4, the CPU 600 receives signals from the variety of sensors and switches included in an input unit 61 and turns on or off the electric device 62. The self-diagnosis unit 602 compares the values of the current and voltage of the electric device 62 with predetermined values to diagnose the state of the electric device 62. Specifically, the self-diagnosis unit 602 determines the ON or OFF state of the electric device 62 and compares the values of the voltage and current of the electric device 62 with the predetermined values.

An artificial intelligence control device according to the fourth embodiment of the present invention can be provided with a timer function for electric devices using a CPU and an exclusive timer circuit as well as an ON/OFF control function for the electric devices provided for the convenience to a driver, thereby increasing the ease of driving. In addition, an independent CPU and memory (not shown) may be provided for generally controlling the artificial intelligence control devices and allowing drivers to control the electric devices by changing set values and storing the changed set values. Since the artificial intelligence control device includes a self-diagnosis unit which determines the ON or OFF state of the electric device 62 and compares the values of the voltage and current of the electric device 62 with predetermined values, the reliability of an automobile is increased. In addition, by using a communication unit, the artificial intelligence control device can mutually communicate with a controller for other electric devices through a serial link such as an RS232C or LAN to share the result of controlling and diagnosing the state of the electric devices, so various applications of artificial intelligence control and diagnosis of the electric devices can be accomplished.

As described above, an artificial intelligence diagnostic device for an automobile according to the present invention is mainly provided for the safety and convenience to drivers. Unlike existing diagnostic devices simply diagnosing the break of a fuse, the artificial intelligence diagnostic device of the present invention diagnoses the malfunction of a variety of electric devices using a diagnostic CPU and reports the diagnosed result to drivers through an easily recognizable LED lighting display, character message and voice message, so that a driver can easily know which part of an automobile has malfunctioned while driving. Consequently, the automobile can be easily repaired in a considerably reduced time at a low cost. Moreover, since the automobile is automatically examined daily for safety, accidents due to poor maintenance can be reduced.

According to an artificial intelligence diagnostic device according to the present invention, malfunction related to an engine, which has been able to be diagnosed in only automobile service stations, can be easily diagnosed. In addition, since the malfunction of a fuse or relay related to an electric device can be easily diagnosed, drivers themselves can easily replace it personally. Moreover, the diagnosed result is output in various ways so that drivers can select an output format as occasion demands. Since the diagnosed result is reported to a control center through a mobile communications terminal, measures suited to the state of malfunction can be taken rapidly.

According to an artificial intelligence control device for an automobile of the present invention, ON/OFF control for electric devices provided for the convenience to a driver can be smoothly accomplished. A timer function of the electric devices which is related to an ON/OFF state thereof increases the convenience of driving. An independent CPU and memory is provided for generally controlling the artificial intelligence control device, allowing drivers to control the electric devices by changing set values and storing the changed set values. In addition, the normal or abnormal states of electric devices, which are determined by a self-diagnosis function, are reported to drivers through a character or voice message, the drivers can easily understand whether the electric devices are in a normal or abnormal state, thereby increasing the safety of driving.

What is claimed is:

1. An artificial intelligence diagnostic device for diagnosing a malfunction of an automobile, comprising:
   an electronic time and alarm control system diagnostic unit for diagnosing the state of an electronic time and alarm control system which controls electric devices of the automobile;
   a junction box diagnostic unit for diagnosing the states of the various fuses and relays included in a junction box;
   a diagnostic central processing unit for receiving and analyzing diagnosis signals output from the electronic time and alarm control system diagnostic unit, the function box diagnostic unit, and an engine control unit, and generating a signal corresponding to an abnormal state; and
   output means for receiving the signal output from the diagnostic central processing unit and reporting the abnormal state to the driver.

2. The artificial intelligence diagnostic device of claim 1, further comprising a first output unit comprising a lamp for indicating a specific fuse or relay having a malfunction in the junction box according to the result of diagnosis of the junction box diagnostic unit and a lamp driving circuit.

3. The artificial intelligence diagnostic device of claim 2, wherein the output means comprises a second output unit for reporting the abnormal state to the driver through a character message.

4. The artificial intelligence diagnostic device of claim 3, wherein the output means comprises a third output unit for reporting the abnormal state to the driver through a voice message.

5. The artificial intelligence diagnostic device of claim 4, wherein the diagnostic central processing unit receives and analyzes the diagnosis signal from the junction box diagnostic unit, and drives the first output unit to light a lamp corresponding to a specific fuse or relay having a malfunction and outputs a character message and a voice message reporting the state of malfunction through the second and third output units, respectively, when it is determined that the fuse or relay in the junction box malfunctions.

6. The artificial intelligence diagnostic device of claim 4, wherein the diagnostic central processing unit receives and analyzes the diagnosis signal from the engine control unit and outputs a character message and a voice message reporting the state of malfunction in the engine control unit through the second and third output units, respectively, when it is determined that the engine control unit malfunctions.

7. The artificial intelligence diagnostic device of claim 4, wherein the diagnostic central processing unit receives and analyzes the diagnosis signal from the electronic time and alarm control system diagnostic unit and outputs a character message and a voice message reporting the state of malfunction in the electronic time and alarm control system through the second and third output units, respectively, when it is determined that the electronic time and alarm control system malfunctions.

8. An artificial intelligence diagnostic device for diagnosing a malfunction of an automobile, comprising:
 a diagnostic circuit for diagnosing the state of an electronic time and alarm control system which controls devices provided to increase the convenience to a driver, the states of the various fuses and relays included in a junction box, the state of an engine control unit which checks and controls the state of an engine, and the state of an antilock break system;
 a central processing unit for receiving and analyzing a diagnosis signal output from the diagnostic circuit and outputting the result of diagnosis;
 an output unit for reporting the diagnosis result output from the central processing unit to the driver; and
 a communication output unit for outputting the diagnosis result in the form of a communication signal.

9. The artificial intelligence diagnostic device of claim 8, wherein each of a variety of electric devices of the automobile is provided with a circuit for measuring a current or a circuit for measuring a voltage depending on a method by which each electric device is driven, and the diagnostic circuit receives signals output from the circuits to diagnose the state of each electric device.

10. The artificial intelligence diagnostic device of claim 8, wherein the output unit comprises a character display unit, and a character message reporting the diagnosed result is output through the character display or a display unit of a navigation device installed in the automobile.

11. The artificial intelligence diagnostic device of claim 8, wherein the output unit comprises a voice output unit, and a voice message reporting the diagnosis result is output through the voice output unit or a speaker of an audio system installed in the automobile via the external input terminal of the audio system.

12. The artificial intelligence diagnostic device of claim 8, wherein the central processing unit outputs the diagnosis result to a mobile communications terminal connected to the communication output unit through the communication output unit so that the diagnosis result can be wirelessly transmitted to a control center through the mobile communications terminal.

13. An artificial intelligence diagnostic device for diagnosing a malfunction of an automobile, comprising:
 a code analyzer for receiving and analyzing signals from an electronic time and alarm control system for controlling devices provided for the convenience of a driver, an engine control unit for checking and controlling the state of an engine, a transmission control unit, and a general electric device;
 a diagnosis unit for diagnosing the states of fuses and relays included in a junction box and outputting the diagnosed result, and for receiving a signal output from the code analyzer and outputting the result of diagnosing the state of the engine control unit, the transmission control unit, the electronic time and alarm control system and the general electric device;
 a lamp output unit for indicating a specific fuse or relay having a malfunction according to the diagnosis result output from the diagnosis unit;
 a data communication converter for receiving the diagnosis result from the diagnosis unit and converting it into a communication signal; and
 a diagnosis result output unit for receiving the signal output from the data communication converter and outputting the result of diagnosing the state of each electric device so that a driver can easily recognize the diagnosis result.

14. The artificial intelligence diagnostic device of claim 13, further comprising a wireless transmitter for converting the signal output from the data communication converter into a wireless signal which is transmitted, and a wireless receiver for receiving the wireless signal from the wireless transmitter and providing the wireless signal to the diagnosis result output unit.

15. The artificial intelligence diagnostic device of claim 13, wherein the diagnosis result output unit is provided with particular operating software, and comprises a personal digital assistant or a personal computer for receiving the signal output from the data communication converter, displaying the result of diagnosing the state of each electric device in a form which can be easily recognized by the driver or reporting the diagnosis result through a voice message, and outputting the diagnosis result to a mobile communications terminal so that the diagnosed result can be wirelessly transmitted to a control center through the mobile communications terminal.

16. An artificial intelligence control device for controlling electric devices of an automobile, comprising:
 a controller for receiving signals from a variety of sensors and switches of an automobile, controlling an electric device in accordance with the signals received from each corresponding sensor or switch, and outputting a warning signal related to a particular electric device;
 a diagnosis unit for diagnosing a malfunction of each electric device; and
 an output unit for outputting the control state of the controller and the result the diagnosis by the diagnosis unit to allow a driver to recognize the result of diagnosis.

17. The artificial intelligence control device of claim 16, further comprising a communication unit connected to the controller to mutually communicate with a controller for other electric devices, thereby allowing the controller to share the results of controlling and diagnosing the electric devices with the controller for other electric devices.

18. The artificial intelligence control device of claim 16, wherein the output unit comprises a character display unit for outputting a character message and a voice output unit for outputting a voice message.

19. The artificial intelligence control device of claim 16, further comprising input means for allowing the driver to set an ON/OFF function and timer function for each electric device and to set the input means to change and store a control value.

20. The artificial intelligence control device of claim 19, wherein the changing and storing of the control value set by the driver is performed by the central processing unit and a memory.

21. The artificial intelligence control device of claim 19, wherein the timer function for the electric devices is performed by the central processing unit and an exclusive timer circuit.

* * * * *

UNITED STATES PATENT AND TRADEMARK OFFICE
CERTIFICATE OF CORRECTION

PATENT NO.    : 6,668,219 B2
DATED         : December 23, 2003
INVENTOR(S)   : Chang-sun Hwang et al.

It is certified that error appears in the above-identified patent and that said Letters Patent is hereby corrected as shown below:

Title page,
Item [30], Foreign Application Priority Data, please add the following:
-- July 24, 2000 (KR) 2000-21079
   July 25, 2000 (KR) 2000-21141
   January 5, 2001 (KR) 2001-220 --

Signed and Sealed this

Thirteenth Day of April, 2004

JON W. DUDAS
*Acting Director of the United States Patent and Trademark Office*